Dec. 9, 1952 R. H. VARIAN 2,620,571
CONVECTION INCLINOMETER
Filed June 20, 1945 4 Sheets-Sheet 1
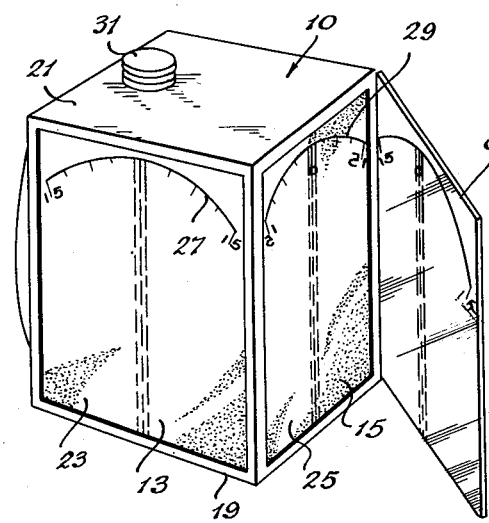
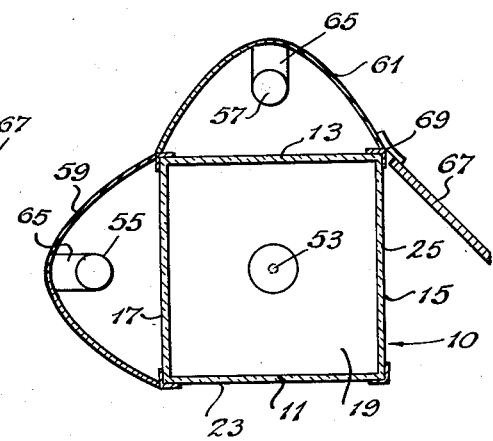
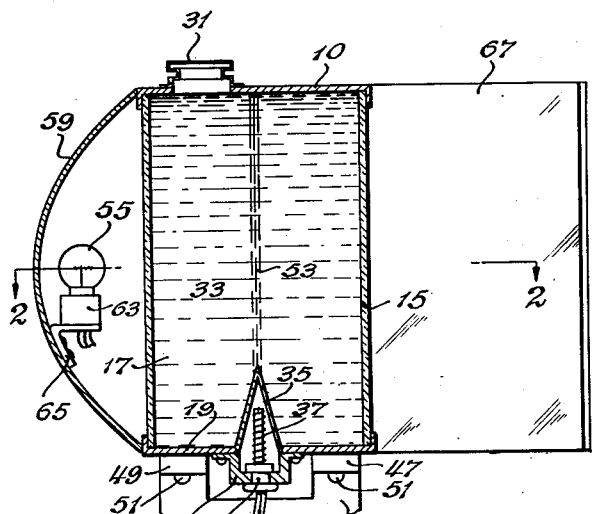
INVENTOR
RUSSELL H. VARIAN
BY
*Herbert H. Thompson*
his ATTORNEY Dec. 9, 1952   R. H. VARIAN   2,620,571
CONVECTION INCLINOMETER
Filed June 20, 1945   4 Sheets-Sheet 2
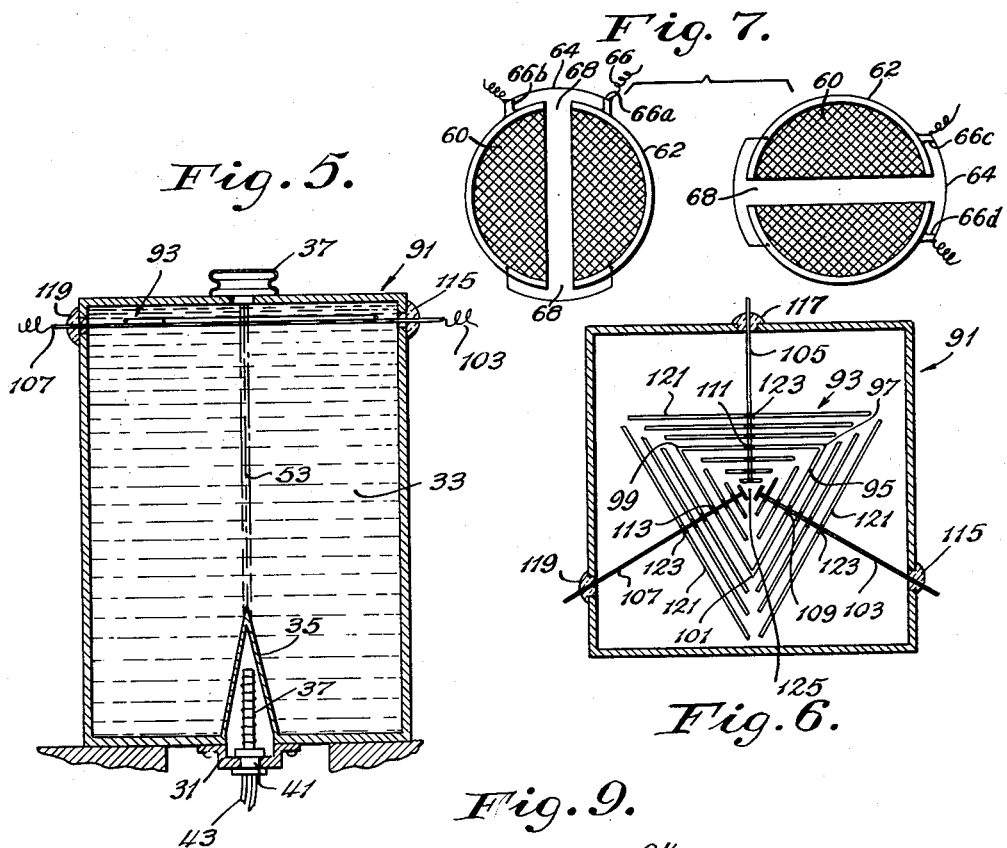
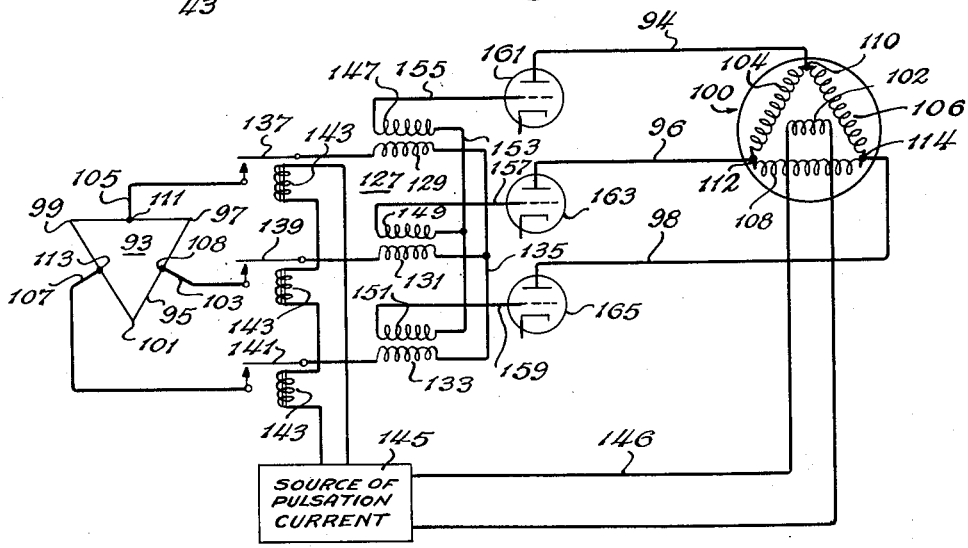
INVENTOR,
RUSSELL H. VARIAN
BY
Herbert H. Thompson
his ATTORNEY.

Dec. 9, 1952    R. H. VARIAN    2,620,571
CONVECTION INCLINOMETER
Filed June 20, 1945    4 Sheets-Sheet 3
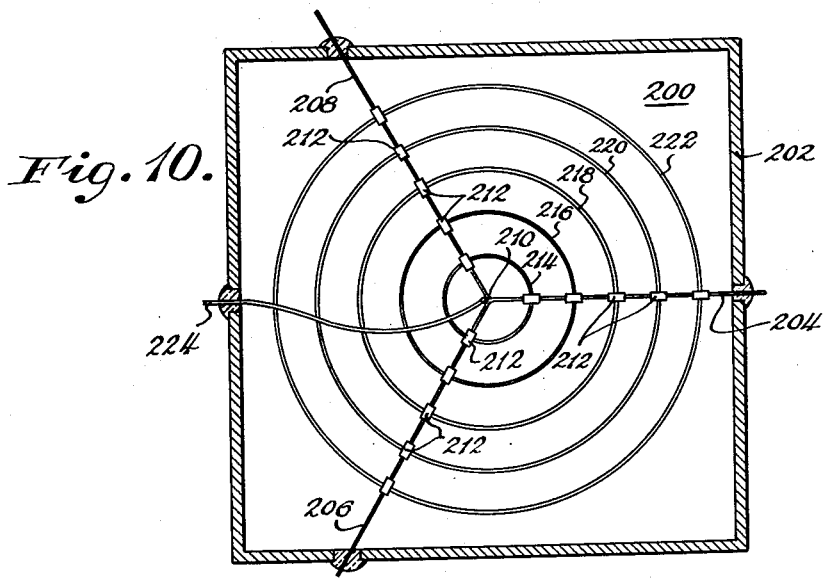
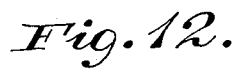
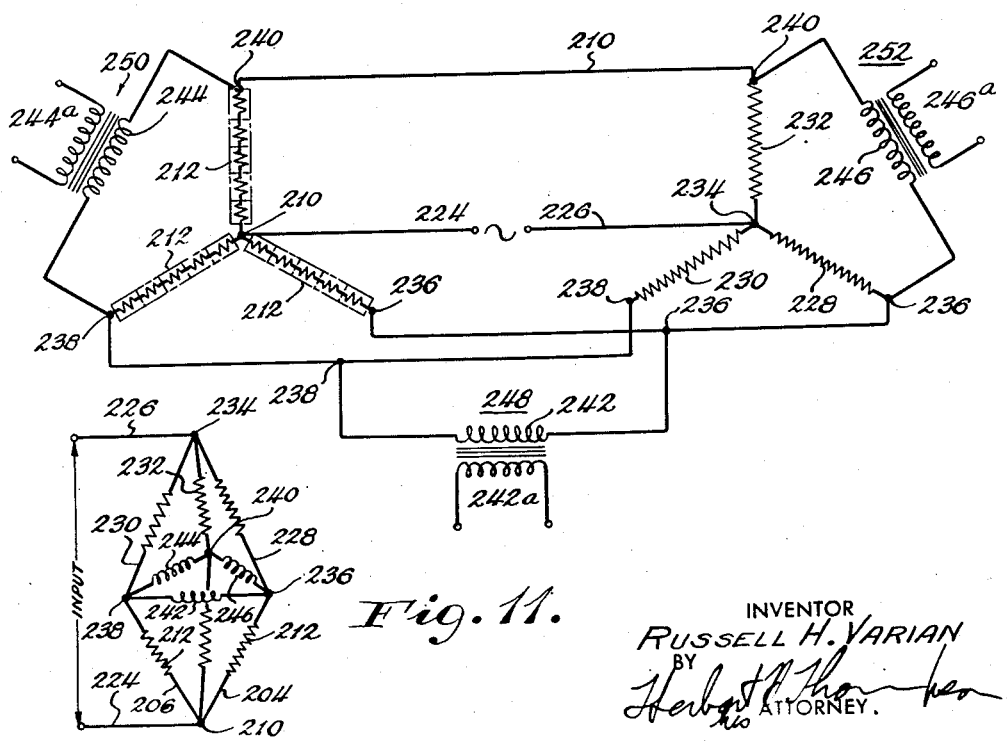
INVENTOR
RUSSELL H. VARIAN
BY
ATTORNEY.

Dec. 9, 1952  R. H. VARIAN  2,620,571
CONVECTION INCLINOMETER
Filed June 20, 1945  4 Sheets-Sheet 4
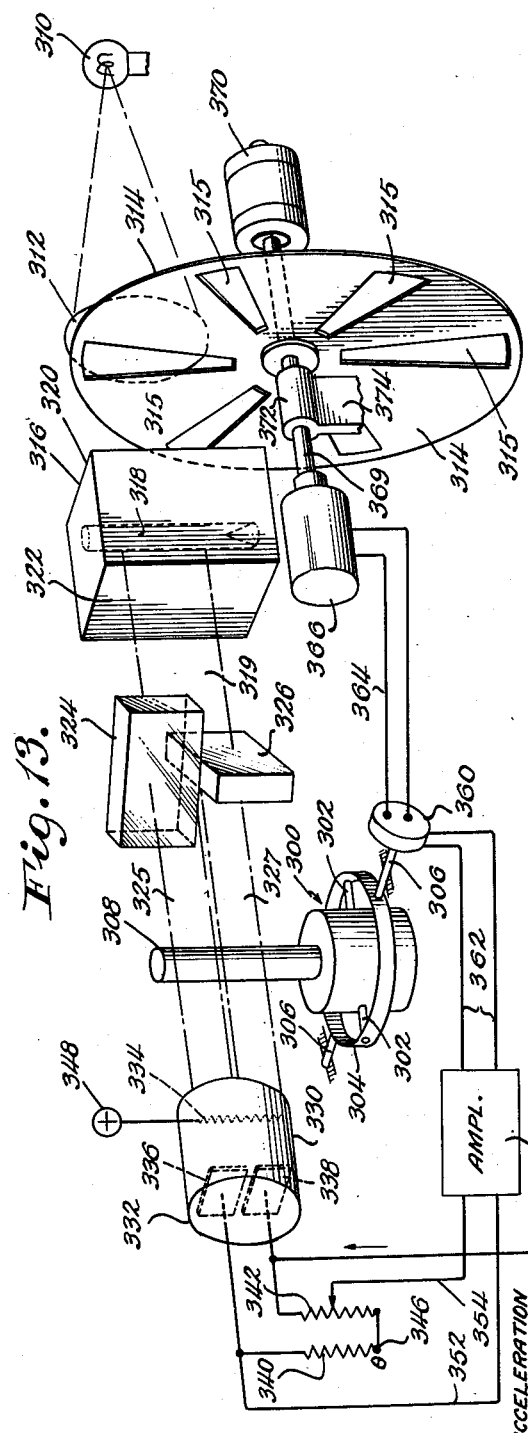
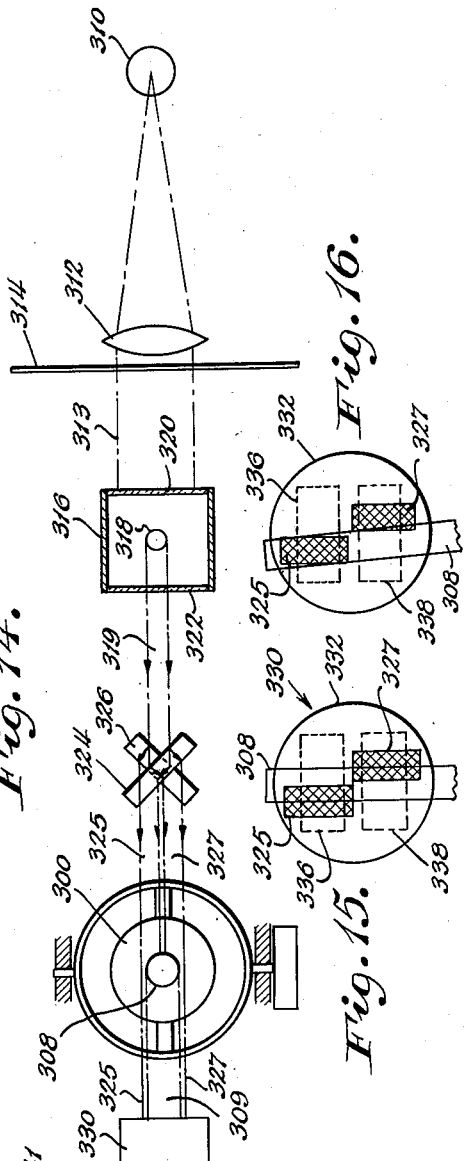
INVENTOR
RUSSELL H. VARIAN
BY Herbert H. Thompson
his ATTORNEY.

Patented Dec. 9, 1952

2,620,571

UNITED STATES PATENT OFFICE 2,620,571

CONVECTION INCLINOMETER

Russell H. Varian, Garden City, N. Y., assignor to The Sperry Corporation, a corporation of Delaware Application June 20, 1945, Serial No. 600,593

4 Claims. (Cl. 33—206)

This invention relates to improvements in inclinometers and to the adaptation of such devices as convection, gravity-determining elements in cooperation with gyro erector systems.

Hitherto, inclinometers, such as used in aircraft, have required the use of suspended weights or pendulums to determine the normal vertical. Such pendulums were set up in aircraft under conditions permitting the determination or establishment of the position or attitude of the aircraft with respect to the vertical. Owing to the mass of the pendulums, a great deal of trouble is encountered in operation, particularly when aircraft, such as an airplane, is subject to rapid changes in velocity, course and attitude. The swinging of the pendulum, due to such changes, introduces transients in the operating system which would destroy stability of operation. To avoid this difficulty, means, usually automatic, are sometimes provided to disengage the pendulum from control during such periods. Even where gyro verticals are used as base lines for aircraft it is usual to employ some type of pendulum or level for controlling the gyro vertical and hence although the gyro vertical integrates the errors of the pendulum, persistent errors will cause deviation of the gyro vertical.

It has now been found that the difficulties above enumerated may be considerably reduced or eliminated by my improved device in which a rising column of liquid is utilized to determine the normal vertical, and special thermoelectric and photoelectric circuits, as well as impedance-controlled circuits, are used to determine and utilize the orientation of the normally vertical, moving column, as its surrounding fluid and container vary in orientation to agree with positional variations of the aircraft in which they are incorporated. The use of convection, gravity direction-determining devices avoids, to a considerable extent, the difficulties inherent in pendulous devices and inclinometers and introduces novel operational features. My invention utilizes an inherent differential in refractivity of the fluid used, due to the temperature differential between the rising column of heated fluid and the cooler body portion thereof. The rising column is visible to an observer. Also, thermoelectric currents can be generated by the action of the moving column on suitably oriented thermocouples.

A Wheatstone bridge connection may be utilized to control appropriate servomotors or torquers with the advantage that the former may be supplied with sufficient power through an amplifier to operate a control surface of an aircraft, if desired. Such direct-powered resistance-controlled circuits are not only of sufficiently high voltage to be suited for direct operation of controlled elements, but the circuits controlled may be located at a distance from the pick-off element proper.

For the direct control of appropriate servomotors or torquers, the inclinometer herein may be incoporated in a photoelectric control system for the motor or torque control circuits, supplied with sufficient power to operate same. My inclinometer is adapted for use as a gravitational reference to control a gyro vertical for which use it has many advantages over pendulums suspended on the gyroscope, as has previously been the practise. According to my invention, my improved thermal reference may be mounted independently of the gyro and its position compared with that of the gyro by photoelectric or other means not requiring contacts or slip rings to be used on the gyroscope.

It is an object, therefore, of the present invention to provide novel convection, gravity direction-determining devices utilizing the differential refractive and thermal aspects of a moving column of fluid in a bath of the same fluid.

Another object of this invention is the provision of visual means for determining the angle of inclination of the moving cone, column, or pencil of fluid from both the horizontal and the vertical.

Another object of this invention is the provision of photoelectric means for determing the angle of inclination of the moving cone, column, or pencil of fluid from both the horizontal and the vertical and extraneously powered gyro erector means controlled by the photoelectric means.

A further object of the invention is the provision of special non-pendulous gyro erectors controlled by convection, gravity inclinometers, through the intermediacy of apparatus energized by differential thermoelectric, as well as resistance-controlled and photoelectric-controlled currents.

These and other desirable features of novelty and advantage of the present invention will be described in the specification, certain preferred forms being illustrated in the drawings by way of example only, for, since the underlying principles may be embodied in other specific installations, it is not intended to be limited to the ones here shown, except as such limitations are clearly imposed by the appended claims.

In the drawings, like numerals refer to similar parts throughout the several views, of which Fig. 1 is an elevation of a bidirectional inclinometer embodying the principles of the present invention;

Fig. 2 is a horizontal section taken on line 2—2 of Fig. 3;

Fig. 3 is a vertical section of the structure shown in Fig. 1;

Fig. 4 is a view similar to Fig. 3 showing electrical connections for determining orientation of the device;

Fig. 5 is a vertical section through the device of Fig. 1 showing the arrangement of a thermoelectric pick-off means;

Fig. 6 is a plan view of the thermoelectric pick-off means used in Fig. 5;

Fig. 7 shows top and bottom views of a modified thermoelectric pick-off means using special heat collector grids;

Fig. 8 is a graph illustrating the electrical characteristics of the grid of Fig. 7;

Fig. 9 is a schematic illustration of a wiring diagram including the thermoelectric pick-off of Figs. 5, 6 and 7 coupled to a gyro erector circuit;

Fig. 10 is a view similar to Fig. 6 showing a directly powered pick-off construction utilizing resistance controls having negative thermal characteristics;

Fig. 11 is a wiring diagram of the resistance pick-off of Fig. 10 with Wheatstone bridge couplings;

Fig. 12 is a wiring diagram of the resistance pick-off of Fig. 10 and Wheatstone bridge connections to output transformers;

Fig. 13 is an elevation and Fig. 14 is a top plan of a gyro erection control system incorporating the inclinometer herein with a photo-electric pick-off means; and Figs. 15 and 16 are face views of the photoelectric cell showing the reference shadows on the cathodes in vertical and tilted positions, respectively.

Considering the invention generally, the primary or basic form of the inclinometer herein functions as a rising vertical column of fluid, which rising column establishes a reference by visible or electric means.

A wide variety of fluids may be used in the inclinometers of the present invention. They should have an adequate temperature range between the freezing and boiling or flash points and should not at any time become too viscous. Turbulence of the fluid within the envelope should be kept to a minimum or should be substantially eliminated so that the device will not provide an erroneous indication. Elimination of turbulence in the fluid is especially important where visual indications are to be used. Additionally, the fluid should have a high coefficient of expansion accompanied by a noticeable change in the index of refraction when its temperature is varied. Transformer oil having a viscosity of 10 centistokes at 100° C. has been found satisfactory. Also, other oils may be used. The silicone fluids or organo-silicon products show a low rate of viscosity change with temperature, and this stability of viscosity makes them suitable for airplane instruments which may undergo great temperature changes in a single flight. The viscosity of the high-viscosity type silicones may vary from 100 to 1,000 centistokes. The flash points range from 600° F. to 640° F., which is considerably higher than that of hydrocarbon oils of equal viscosities at room temperature. The low viscosity type silicones have viscosities ranging from .65 to 100 centistokes. These fluids have boiling points ranging from 99.5° C. for the .65 viscosity to liquids undistillable up to 250° C. even under high vacuum. Freezing points range from —68° C. to —55° C. Flash points range from 70° F. to 475° F. These fluids are characterized by a relatively stable viscosity.

In the visible form of my invention, the moving column of oil is established in a bath of the same fluid by heating a restricted area at the base or cooling a similar area at the top. The rising column of heated oil is hotter than the circumambient body thereof, while the descending column of cooled oil is colder than the body thereof, whereby the refractive index of the moving column is sufficiently different to afford visual identification thereof against the body of the fluid. In the case where thermoelectric or thermoresponsive electric resistance pick-offs are used, the heated or cooled column impinging on specially oriented and connected thermocouples or thermally responsive resistance elements will differentially heat or cool the various thermocouples or resistance elements, thus giving rise to thermoelectric currents of varying intensity or control currents varied in accordance with the thermal response of the resistors. To utilize these relatively weak thermoelectric currents, they are fed through a vibrator or interrupter circuit to the input of a torquer control, including a first amplifier stage of an electronic and amplifier circuit. As such amplifying circuits are well known per se, they will not be described in great detail herein, except in connection with the specific means of feeding signals thereto corresponding to the variable orientation of the reference column of heated fluid. Where A. C. powered resistance-controlled Wheatstone bridge circuits are used, they may use high voltage, and directly control the servomotors or other control devices without the necessity of signal amplifying means.

The invention herein will now be considered with more specific reference to the devices shown in the drawings in which the principles are embodied. In the form shown in Figs. 1 to 3, a casing or envelope 10 is shown as a generally cubical container having translucent or transparent front and back walls 11, 13 and side walls 15, 17, together with bottom 19 and a top 21. The walls 11 and 15 may comprise translucent panels 23, 25 of frosted glass, or the like, preferably provided with scales 27, 29 calibrated to indicate the angular deviation of the container or inclinometer from the vertical.

The chamber 10 is provided with an expansible overflow chamber 31 adapted to accommodate the overflow, on expansion, of fluid 33 contained in the chamber. Centrally of the base 19 there is provided a conical heating surface 35 which is preferably pointed, as shown, to thereby provide a substantially point-source of heat. This heating surface is heated by heating element 37 contained therein and supported on a bracket 39 secured to base 19. An insulating bushing 41 serves to hold the base of the heating element 37 and permit introduction of the feed wires 43. The inclinometer 10 may be mounted on a bracket 45 having arms 47, 49 to which the chamber is secured as by means of bolts or screws 51. In its simplest form of operation, when the heating element 37 is energized, conical heating surface 35 heats the circumambient oil and the latter rises in a restricted vertical column or pencil 53 within the body of the liquid 33. Due to the difference in the index of refraction of the heated column as compared against the background of the cooler body of liquid, the position of column 53 can be readily established or observed.

While the liquid in the inclinometer has been described as being locally heated to establish a rising column of differentially heated fluid, which incidentally also warms the entire body of the liquid sufficiently to keep its viscosity low it will, of course, be understood that the inverse phenomenon of cooling may be utilized. Under such circumstances, a cold spot or cooling arrangement may be applied or used at the upper surface or top of the inclinometer to establish a descending cool column of reference liquid moving in a bath or body of circumambient warmer fluid. Where a cooled column is used, and electric pick-offs are included in the system, the pick-offs will desirably be mounted at the bottom of the inclinometer.

To enable the inclinometer to be used on an aircraft, or the like, in association with the instrument board or panel, means are provided to illuminate the body of fluid so as to permit the visual identification of the position of the moving column of fluid 53. For this purpose point source lamps 55, 57 are mounted in housings 59, 61 at adjacent sides of the casing and opposite the panels 23, 25. The housings 59, 61 are formed as paraboloids of revolution, and the convection current will appear as a sharp line regardless of whether it is exactly vertical in the chamber, or whether it is inclined at an angle thereto. The lamps may be mounted in the usual sockets 63 secured onto bases 65 of the housings and spaced away from the panels a sufficient distance to avoid or preclude any direct heating effects on the body of fluid 33.

The front or main panel 23 with its inclinometer scale 27 can be read directly by the pilot, who can determine the amount of angular inclination from the vertical by visual inspection. To determine the amount and direction of pitch inclination, the side panel 25 with its inverted scale 29 is viewed in a slant mirror 67 secured to the casing 10 by a bracket 69, as shown more particularly in Figs. 1 and 2. From this showing, it will be seen that the pilot can visually determine at a single glance both the fore-and-aft and lateral attitudes of his ship. The chamber as a whole is always radiating heat, so the rising column is always hotter than the rest of the oil, and the device can operate continuously.

While the body of liquid 33 may be subjected to mass or acceleration effects arising from the operation of any aircraft, it will be noted that this body of liquid is restricted or wholly confined in a closed container, and is thereby precluded from exhibiting or being subject to turbulence or surging. The device is very responsive due to the maintenance of the fluid in a mobile or non-viscous condition.

The form shown in Figs. 1 to 3 may be mounted in a cockpit, at about eye-level, and to either side of the pilot. Where the device is to be installed, say, at the righthand side of the cockpit, the mirror 67 would be shifted over to cooperate with panel 17 while the lamp 55 and housing 59 will be shifted to cooperate with panel 15.

The device just described is essentially a visual indicator. In the form shown in Fig. 4, the inclinometer may be provided with a dial-indicating means 71 included in or forming a part of an amplifier 73. In this form, opposed thermometers 75, 76 may be mounted in the cover 21 and connected through lines 79, 81 to indicator 71. Desirably, the thermometers 75, 78 may comprise calibrated thermocouples. It is to be understood, of course, that in the forms of the invention in which electrical signal generating means or signal producing means are provided, the fluid container or envelope 10 may be cylindrical in shape or of any other desired geometric configuration, and the convection stream producing means 35, 37 may be situated at one end of the envelope and the signal generating or signal producing means may be conveniently situated at the other end of the cylinder but in axially spaced relation to elements 35, 37.

To maintain the body of fluid 33 within optimum temperature ranges, means are provided to automatically control the temperature thereof. The feed lines 43 to the heater 37 include a switch 83 serviced by current input 85 which may supply an alternating current of suitable voltage. A second heater or grid 80 may be mounted in the bottom of the device and connected to service lines 85 through leads 82 and thermoswitch 84. A thermostat 87 is mounted in the cover and will be connected to the thermoswitch, in any suitable manner, as through lines 89. By suitably calibrating the thermostat and the thermoswitch, the body of liquid 33 can be raised to or maintained at any desired operating temperature, which will usually be appreciably below that of the reference stream 53. This feature is of particular importance if the inclinometers are to be fabricated and stocked for distribution to various parts of the world. In the tropics it will be obvious that the body of fluid 33 would not need any extraneous heat. However, in the arctic or in high altitude flying, the fluid 33 might well require positive heating to enable it to function as desired. The thermostat control of the heater, makes the system truly flexible and adaptable for all flying conditions.

Where the inclinometer described above is to be used as a gyro erector, an electrical pick-off may be incorporated therein. One form of such a system is illustrated in Figs. 5, 6, and 9, and will now be described. In this system, the usual container 91 is provided with the heating element 35 and accessories, but the walls need not be translucent or transparent. In this system a thermoelectric pick-off 93 is provided, which pick-off comprises a triangular member 95 of constantan, German silver, or suitable metal, having apexes 97, 99 and 101. Lead wires 103, 105 and 107 of different metal are welded to the sides of the triangle, as indicated at 109, 111 and 113. The leads 103, 105 and 107 are taken out through apertures 115, 117 and 119 in the walls of the container, the apertures being suitably sealed, as shown. To increase the thermo efficiency of the thermocouple system, rods 121 are welded or brazed, as indicated at 123, to the leads 103, 105 and 107. A sufficient number of these rods or radiators are secured in place on the leads and are arranged in parallel and without interconnection to the several leads, so that each lead has its own separate, heat-collecting grid structure. With this arrangement, a maximum amount of heat is collected at each main thermojunction 109, 111 and 113.

In normal, vertical condition of the gyro erector, the rising column or pencil 53 of heated fluid will impinge at the geometric center 125 of the thermocouple system, and each leg of the delta connection will be uniformly heated. The result is that all three junctions will be at the same temperature, and no current will flow. When the container or chamber 91 is tilted from its normal vertical position, the column 53 will apparently be tilted in the opposite direction. With such angular variation, the heating effect of the column will be shifted from the center of the grid system 125 to any one of the three grid systems associated with leads 103, 105 and 107, or combinations, in varying degrees of intensity. This will result in the differential heating of thermocouple junctions 109, 111 and 113. When the currents generated at these respective junctions are drawn off through their respective leads, an amplified signal may be fed into appropriate servomotor controls on aircraft. To perfect this result, the system indicated in Fig. 9 may be used. A Y—Y connected stepup transformer 127 is provided with primary windings 129, 131 and 133. These windings are interconnected to a common return 135 and are individually connected through make-and-break keys 137, 139 and 141 to leads 105, 103 and 107, respectively. The make - and - break keys are caused to vibrate by means of coils 143 simultaneously fed with pulsating current from a source of pulsation current 145. With the source of pulsation current in operation, the make-and-break keys will be simultaneously operated and the thermoelectric currents developed in device 93 will be fed into primaries 129, 131 and 133 as interrupted D. C. To step up these currents, secondaries 147, 149 and 151 are connected through a common line 153 and individually led to lines 155, 157 and 159 to the control grids of amplifier tubes 161, 163 and 165 of a first amplification stage of any suitable gyro erector or torquer control circuit.

As shown in Fig. 9 a torquer 100 comprises a Δ wound stator having windings 104, 106 and 108 joined at mode or junction points 110, 112, 114, as shown. The junction points are connected by leads 94, 96, 98 to the plates 161, 163, 165 of the amplifier. The rotor coil 102 of the torquer is connected through leads 146 to the source of pulsation current 145, previously described. While the one stage of amplification has been indicated it will, of course, be understood that this showing is essentially diagrammatic and the invention contemplates the use of any desired number of stages of amplification.

It will be seen that with the differential heating of the several junctions of thermoelectric device 93, one junction may receive more heat than the other and will, therefore, serve as the hot junction, while one or both of the other junctions may serve as the cold junction. Additionally, two junctions may be uniformly heated and a third junction served as the common cold junction. Under these conditions, the energy fed into the transformers will vary from maximum to null and any two signals may be cancelled or modified so that the input into the amplifier system may comprise a definite, oriented signal which can be modified, plus or minus, by the signal or signals from the associated legs of the thermo battery 93.

In Fig. 7 there is shown a novel pick-off structure showing superimposed semicylindrical cellular or honeycomb collectors or grids 60 and 60' having a peripheral sheathing 62 of suitable metal, thermally responsive resistors or thermoelectric generators 64 being brazed or otherwise secured to the surface 62 in good heat conductive relation. The elements 64 will be provided with suitable current leads 66, which may be connected in the erecting circuit as shown in Figs. 9, 11 and 12. In the showing of Fig. 7, two pairs of units 60, 60' are mounted in quadrantal relation, with each pair rotated through an angle of 90° with respect to the other pair and a gap or space 68 formed between the elements of each pair. This particular construction will give an operational characteristic illustrated by the curve of Fig. 8 when two halves of a unit are tilted out of the vertical plane (at right angles to the drawing). The righthand segment, assumed to be in the path of the convection column 53, will provide the hot junction of a thermocouple, at junction 66a, and the left hand segment will provide the cold junction at 66b. When the convection stream is in this position the current will be flowing in one direction and is represented by 60a, Fig. 8. When the convection stream impinges on the left hand segment, the current is reversed, and is represented by 60b in Fig. 8. In the apparatus shown in Fig. 7, the grid segments including the grid mesh 60 and 60' and the outer grid ring 62 and the leads 66 would preferably be made of copper, while the element 64 would be made of constantan, or other suitable metal. If desired, the thermocouple wire 64 could be duplicated on each pair of grids and connected in parallel to equalize the signal for different positions of the convection stream on one of the grids. In the gaps 68 between the elements, no current is generated, and the voltage curve will have a relatively sharp differential indicated by the slope 68a in the curve of Fig. 8. The cell or heat-responsive structure of members 60 may be made of any suitable height to increase the active area thereof. The particular cell structure may be prepared by the longitudinal or axial splitting of grid structures prepared according to the teachings of application Serial No. 588,580, filed April 16, 1945 by the present inventor and Sigurd F. Varian.

Referring now to Figs. 10, 11 and 12, invention herein is illustrated with reference to the use of Wheatstone bridge circuits which are adapted to directly control servo mechanisms or indicators. For this purpose, a special pick-off 200 is used. This device comprises an assembly of resistance elements mounted in a Y or star connection in a suitable container. The container 202 may be four-walled, as shown, and is apertured to receive leads 204, 206 and 208 of the pick-off connected at center or midpoint 210. Special resistance elements 212 are electrically connected to the leads and in series therewith.

The preferred type of resistance element is the so-called "Thermistor," which is a special metal in which the change of resistance with current or voltage varies rapidly with the change of temperature. Almost always, the resistance of these elements decreases with temperature increase, and hence they are characterized by a negative temperature coefficient. At constant temperature, they follow Ohm's Law. These resistance elements may be made of semi-conductors comprised of materials such as uranium oxide ($U_3O_8$), nickel oxide ($NiO$) and manganese oxide ($Mn_2O_3$). The uranium oxide has a specific resistance of 50,000 ohm/cm. at 0 degrees centigrade, which decreases rapidly with rise in temperature, being 2,800 ohm/cm. at 100 degrees and 15 ohm/cm. at 500 degrees centigrade. A mixture of nickel oxide and manganese oxide exhibits a still larger negative temperature coefficient of resistance, the specific resistance values at 0 and 500 degrees centigrade being respectively 10,000 and 0.8 ohm/cm. The current passed through these elements varies quickly with changes of temperature so that there is little time lag involved.

The several resistance elements or "Thermistors" are in heat conductive relation to a plurality of concentric rods or wires 214, 216, 218, 220 and 222 forming a heat-collecting grid. These grid members are not in electrical contact with the leads 204, 206, 208, or any of the resistance elements 212. A power lead 224 is connected to the apex 210 of the pick-off grid. The grid is heated in the same manner as that shown in Figs. 5 and 6.

To utilize the resistance modified differential currents set up in the various branches of the pick-off, the circuit indicated in Figs. 11 and 12 can be used. A pair of leads 224, 226 is connected to a source of alternating current and to the three-legged pick-off, just described, and a cooperating three-legged Wheatstone bridge. In the schematic diagram of Fig. 11, the Wheatstone bridge has three legs 228, 230 and 232 and a common junction 234. Leg 228 is joined to leg 204 of the pick-off at 236, while legs 230 and 206 have a common junction at 238, and legs 208 and 230 have their junction at 240. Primary coils 242, 244 and 246 of transformers 248, 250 and 252 (Fig. 12 are bridged across the junctions 236—238, 238—240, and 240—236, respectively, serving as crossovers in the Wheatstone bridge circuits. The secondaries 242A, 244A and 246A are connected to control circuits as desired. While these pick-offs have been shown as inductive, the invention contemplates the use of other couplings, including capacitative and resistance couplings. In Fig. 12, the various junction points are shown connected by leads, but the arrangement is essentially one of direct coupling, as indicated in Fig. 11. For purposes of convenience, these leads, representing a common junction point, have been identified with their reference numbers.

With the circuit arrangements shown, it will be appreciated that the Wheatstone bridge and associated transformer sections may be separately mounted from the pick-off element proper and interconnection made by suitable wiring.

In operation, with pick-off 200 in neutral position, and all parts uniformly heated, the legs of the bridges will be at uniform potential. Whenever the heating effect varies in any sector, differential currents will be delivered from the legs of the pick-off to the appropriately selected legs of the Wheatstone bridge, and the crossover transformers will deliver variable currents to the system to be controlled. The specific control mechanism utilizing the differential currents developed in the novel pick-off-Wheatstone bridge arrangement is already known in prior patents and applications and will not be described herein in detail.

Referring now to Figs. 13 and 14, these show how my invention may be applied as a gravitational controller for gyro vertical. In these figures there is shown an optical type of convection erector in which the inclinometer or convection part of the erector together with all the electrical circuit parts and controls is fixed to a case, and the gyroscope which is to be controlled carries only a cylindrical rod or tube which intercepts two vertically displaced horizontal beams of light. Under level flying conditions the beams of light will be intercepted by the rod or cylinder mounted on the gyroscope and a shadow will be cast behind the intercepting member. Within the shadow of this interceptor will be mounted a photoelectric cell having a common grid and vertically spaced cathodes connected to an amplifier circuit which controls a torque motor mounted on the gyroscope casing or gimbals. The torque motor is powered by a generator driven with a shutter which intercepts a focused beam of light from a suitable light source and directed onto the inclinometer or convection device, so that its beam is varied or displaced by the transient relation of the vertical column or cone of heated or cooled fluid set up in the inclinometer.

Considering this control system in specific detail, an attitude gyro or gyro vertical 300 is supported in bearings 302 which are mounted on gimbal 304 having bearings 306. On top of the gyro rotor 300 is mounted a cylindrical post or tube 308. This member may or may not rotate with the rotor, depending on the design of the rotor bearings.

The optical system adapted to cooperate with the rotor index or column 308 comprises a source of light 310, a lens 312, shutter 314, with inclinometer 316, and convection stream 318. The sides of the container 316 are provided with parallel transparent windows 320, 322 transversely of the beam of light from the lens. A pair of glass plates 324, 326 are set up on ends and set one upon the other in 90° relationship, as shown more particularly in Fig. 14. Photoelectric cell 300 is mounted in the normal path of the beam of light passing through the inclinometer and the oblique plates. This member may include a casing 332, a grid anode 334 and a pair of vertically spaced horizontal cathodes 336, 338. The cathodes 336, 338 are connected respectively to fixed resistance 340 and variable resistance 342 which are joined at a common terminal 346. Terminal 346 may be connected to one terminal of a suitable battery and terminal 348 connected to the end of the anode screen 334 may serve as the other connection to the B-battery. The cathode 336 is directly connected through line 352 to an amplifier 350 and cathode 338 is connected to the amplifier 350 through line 354 and variable resistance 342. A torque motor 360 is connected to the amplifier through lines 362 and also through lines 364 to generator 366 mounted on shaft 369 of motor 370 which drives shutter 314. The shaft 369 may be mounted in a bearing 372 secured to or formed as part of a supporting bracket 374. The shutter 314 will be provided with suitable radial apertures 315.

The light from source 310 will fall on lens 312 and form a parallel beam 313. The beam 313 will pass through the cell 316. That portion of the beam which cuts reference column 318 of the inclinometer will be refracted and cast a shadow indicated generally by the numeral 319. This shadow or beam 319 will impinge on the angularly displaced refractive plates 324 and 326 where it is split to give an upper shadow 325 and a lower shadow 327 which are laterally displaced or widened as indicated in Fig. 14.

The combined width of the offset shadows 325 and 327 will desirably exceed the diameter of rod or tube 308 and of the shadow 309 cast thereby. Referring, in this respect to the details shown in Figs. 15 and 16, it will be noted that the shadow 309 is vertically centered in the face of photoelectric cell 330 and is alternately overlapped at the sides by shadows 325 and 327 respectively. It will be noted further that shadows 325 and 327 are vertically offset with respect to each other. The shadows as combined in Fig. 15 will mask substantially equal areas of the photoelectric elements or cathodes 336 and 338. Under these conditions balanced currents obtain in the leads 352 and 354 which feed amplifier 350, and no error signal will be developed.

Under the conditions shown in Fig. 16 the reference member 308 is tilted to one side. The lower photoelectric element or cathode 338 will be seen to be masked by the combined shadows 309 and 327. The upper cathode 336 will have the shadows 325 and 309 substantially coinciding so that its active or exposed area is increased by at least half the width of the shadow 309, while the lower element 338 has had its active area decreased by substantially the same amount. This gives a relatively great increase in active surface of cathode 336, with the result that an error signal is set up and amplified in amplifier 350. Not only is an error signal set up, but, due to the particular shift or location of the shadows, in this instance to the left as shown in Fig. 16, the signal will vary in sense as well as in volume. The amplifier error signal will then be transmitted to the torque motor 360 which will react on the gyroscope through trunnion 306 to erect the gyroscope, and, in so doing, to cause the attitude gyro with its superposed member 308 to be restored to normal position. The torque motor, as previously indicated, is powered by generator 366 which is continuously driven by motor 370, the latter also serving as driving means for the shutter 314 mounted on the motor generator shaft.

From the showing in Fig. 16 it can be seen that when the shadow 309 moves to the right instead of to the left, as shown, a greater portion of the area of cathode 338 will be exposed to the light, while the major portion of cathode 336 will be masked. This condition will result in the inversion of the sense of the error signal from that obtained when the condition already described with respect to Fig. 16 is present. The effect of the angular deviation due to the acceleration, just described, is comparable to variations in the resistors 340 and 342 of the Wheatstone bridge circuit connected between the amplifier and the photoelectric cell. The current produced in the photoelectric cell will have a specific phase relation to shutter 314. When the inclination varies opposite that indicated in Fig. 16 there will be a phase difference of 180° with respect to the reference phase generated by generator 366. The generator phase is caused to be displaced 90° from either of the tilt indications described above, so that when a signal of one phase is obtained from the erector 308, a rotating magnetic field of one sign is obtained, whereas if the phase of the erector signal is reversed, the direction of rotation of the magnetic field is reversed. The erection may be readily eliminated during turns if desired by the introduction of a turn signal as sensed by some means responsive to acceleration forces, represented by box 341.

The device described provides a novel electrical gyro erector which has no electrical slip rings or connections on the gimbals of the gyro and no pendulous masses mounted on the gyro. As shown and described, the reference beam or stream 318 is a rising convection column, the position of which is compared with that of the post 308 on the gyro. When the housing 320 is tilted the erector herein should give no signal tending to correct the gyro because the convection stream remains vertical, but if there is relative tilt of the gyroscope and stream the shadows will be displaced as previously described and a torque exerted on the gyroscope. Preferably, the torque applied to the gyroscope is relatively weak so that the resulting precession is slow as is customary in gyro verticals, so that the gyro does not respond to temporary displacement of the convection column, but only to a continued variation in relative tilt of the column and gyroscope.

It will now be appreciated that there has been provided a novel convection type gravity inclinometer and gyro erection control employing such inclinometer and characterized by an absence of pendulous mechanical parts, and consequent comparative freedom from conditions due to acceleration of pendulous parts during operation of aircraft with which they are associated.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a device of the character described, a closed envelope completely filled with a liquid, heating means providing a fixed, substantially point-source of heat at one end of said envelope for producing a rising, fine, columnar thermal convection stream in said liquid, means at the opposite end of said envelope and spaced from said one end having a thermally variable electrical characteristic, means associated with said last mentioned means for determining a change in the electrical characteristics thereof, said liquid having a viscosity appreciably higher than that of water.

2. In an inclinometer, an envelope completely filled with a liquid, means providing a fixed substantially point-source of heat at one end of said envelope and situated on a central, normally vertical axis of said envelope for producing a rising, pencil-like, thermal convection stream in said liquid normally in coincidence with said axis, a plurality of thermally-variable electrical signal-producing means at the other end of said envelope and axially spaced from said one end, said signal-producing means being disposed within said liquid in mutually spaced relation and in radially spaced relation to said axis, said last-mentioned means being adapted to provide a signal dependent upon the angle of inclination of said envelope relative to said convection stream.

3. An inclinometer comprising a fluid-tight vessel, a liquid medium filling the vessel, said liquid medium having a viscosity appreciably higher than that of water, heating means including a cone-shaped heating surface integral with the bottom of and projecting into the vessel at a central position thereof, said heating means producing by convection a fine rising stream of heated liquid within the vessel, and thermal sensitive means including a plurality of thermocouples positioned adjacent the top of the vessel, said thermal sensitive means being responsive to the relative position of the upper portion of the rising stream of heated liquid.

4. An inclinometer comprising a fluid-tight vessel, a liquid medium filling the vessel, said liquid medium having a viscosity appreciably higher than that of water, heating means including a cone-shaped heating surface integral with the bottom of and projecting into the vessel at a central position thereof, said heating means producing by convection a fine rising stream of heated liquid within the vessel, and thermal sensitive means positioned adjacent the top of the vessel, said thermal sensitive means being responsive to the relative position of the upper portion of the rising stream of heated liquid.

RUSSELL H. VARIAN.

REFERENCES CITED

The following references are of record in the file of this patent:

UNITED STATES PATENTS

| Number | Name | Date |
|---|---|---|
| 1,132,617 | Rector | Mar. 23, 1915 |
| 1,192,911 | Leeds | Aug. 1, 1916 |
| 1,390,783 | Hering | Sept. 13, 1921 |
| 1,561,891 | Antisell | Nov. 17, 1925 |
| 1,754,790 | Groh | Apr. 15, 1930 |
| 1,800,748 | Pfab | Apr. 14, 1931 |
| 1,836,079 | McBride | Dec. 15, 1931 |
| 1,841,607 | Kollsman | Jan. 19, 1932 |
| 1,984,112 | Buchholtz | Dec. 11, 1934 |
| 1,988,858 | Quereau | Jan. 22, 1935 |
| 2,315,167 | von Manteuffel et al. | Mar. 30, 1943 |
| 2,440,189 | Zworykin | Apr. 20, 1948 |
| 2,456,619 | Curry, Jr., et al. | Dec. 21, 1948 |
| 2,478,956 | Webber | Aug. 16, 1949 |

FOREIGN PATENTS

| Number | Country | Date |
|---|---|---|
| 119,308 | Great Britain | Oct. 18, 1917 |
| 122,930 | Great Britain | Feb. 13, 1919 |
| 303,304 | Germany | 1919 |
| 357,784 | Germany | Aug. 31, 1922 |
| 425,059 | Germany | Feb. 22, 1925 |